Sept. 19, 1939.  C. A. NERACHER ET AL  2,173,655
POWER TRANSMISSION
Filed Nov. 27, 1936  4 Sheets-Sheet 2

INVENTORS.
Carl A. Neracher,
Teno Iavelli,
BY Augustin J. Syrovy.
Harness, Dick, Patee & Harris
ATTORNEYS.

Sept. 19, 1939.　　C. A. NERACHER ET AL　　2,173,655
POWER TRANSMISSION
Filed Nov. 27, 1936　　4 Sheets-Sheet 3

INVENTORS.
Carl A. Neracher,
Teno Iavelli,
BY Augustin J. Syrovy.
Harness, Dick, Patee & Harris
ATTORNEYS.

Patented Sept. 19, 1939

2,173,655

UNITED STATES PATENT OFFICE 2,173,655

POWER TRANSMISSION

Carl A. Neracher, Teno Iavelli, and Augustin J. Syrovy, Detroit, Mich., assignors to Chrysler Corporation, Highland Park, Mich., a corporation of Delaware Application November 27, 1936, Serial No. 112,904

26 Claims. (Cl. 74—262)

This invention relates to power transmission mechanism and refers more particularly to improvements in power transmission systems especially adapted for use in connection with motor vehicles, although not necessarily limited thereto.

Our invention, in certain more limited aspects, provides improvements in the drive and control for power transmission systems having epicyclic or planetary gear trains adapted to provide the desired speed ratios between the vehicle engine and driving ground wheels.

One object of our invention resides in the provision of an improved selector and actuating mechanism for obtaining the several speed ratios provided by the speed changing mechanism, the latter being preferably of the planetary gear type although not necessarily limited thereto in the broader aspects of our invention.

A further object of our invention resides in the provision of improved controls and actuating mechanism for selecting and manipulating the various gear trains of a transmission, particularly a planetary type of transmission, whereby means is provided responsive in an improved manner to manual control for automatically and quickly bringing about a complete cycle of gear ratio change.

In carrying out the above objects of our invention, we preferably provide a common actuator or prime mover preferably of the fluid pressure type for applying the necessary force to the braking devices of the planetary trains in order to control the rotation of the desired customary control drums.

Our selector mechanism is under manual control by the vehicle driver for causing the common actuator to quickly and efficiently apply a braking force to the proper drum. This actuator, when of the fluid pressure type, is operated by oil pressure, air pressure either above or below atmospheric pressure, or other equivalent systems. We prefer, according to the teachings of this phase of our invention, to provide for energizing the actuator by oil pressure.

A further object of our invention resides in the provision of an improved selector control mechanism for use with change speed mechanisms of the character aforesaid. We have provided a manually operable selector element for controlling all speed changes, including a neutral setting and reverse, our improved mechanism providing for rapid speed ratio changes in automatic response to manipulation of the selector element between any of its positions of control.

An additional object of our invention is to provide an improved transmission system adapted for manual control with a minimum of effort and a maximum of safety to the operating parts, our system of control being arranged for manipulation with a minimum of effort and attention on the part of the vehicle driver, thereby increasing the safety of vehicle driving and the comfort of the driver.

In carrying out the above objects of our invention we have provided an electrical control for a fluid pressure supply valve, the arrangement insuring release of a driving speed ratio immediately on manual adjustment of the selector element to a new setting. Our mechanism is so constructed and arranged that the fluid pressure operator, acting to provide a selected condition of drive, is immediately released at the start of an adjusting movement of the manual selector element thereby enabling us to utilize the balance of the adjusting movement of the manual selector element to effect selection of a new set of speed ratio gears or a new condition in the transmission, preferably through the intermediary of a common selector operating element. Such arrangement, among other things, reduces the time required to produce changes in the transmission settings, prevents danger of jamming the control parts, and relieves the operator of any conscious effort timing the manual movement of the selector element with other parts of the system.

More particularly, our invention provides a single manually operated shiftable control element for selecting the various drives, including reverse, through the planetary transmission. This shiftable element is so arranged that its stations of control are associated with an H-plate so that the control may be effected in similar manner to shifting movements of conventional gear shift levers of present day countershaft type transmissions or gear boxes. We have so arranged the parts that during selection of our control element, the planetary trains automatically respond to the H-movement to effect complete changes in the settings of the transmission as may be desired. We furthermore preferably arrange our mechanism so that any setting of the transmission may be effected from any other setting without manipulating any intervening drives.

A still further object of our invention is to provide an improved control for transmissions, particularly planetary transmissions, wherein an electrical control means is operable in response to actuation of a single switch which itself is automatically responsive in its actuation to selection of an H-type shifting element, and wherein all stations of control are capable of being selected without operating any of the transmission drives which are not desired during any such selection. For example, where an H-selector element is operably connected to a common operating member for successive adjustments, difficulty has been experienced in providing a single switch electrical control for the power means of the common operating member and in arranging this switch so that it will be not undesirably actuated by the H-selector element during shifting movements thereof. With our arrangement, such difficulties are overcome. In connection with this phase of our invention, we provide an H-shifting path for the selector element having different length "arms" or "legs" for the H-path so that complete adjustment of the selector operating member or other selector mechanism will be brought about between the limits of movement of the selector element along the arm path of greater movement, means being provided to limit actuation of the power controlling switch to the driving stations which are desired to be selected, when the selector element is adjusted along the greater length arm path.

A further object of our invention is to provide an improved arrangement of motor vehicle controls providing for improved ease of driving the vehicle particularly for city driving where frequent starting and stopping is required.

A planetary type of transmission presents a number of advantages over the more conventional sliding gear types of transmissions, and our invention is therefore primarily directed toward planetary types of transmissions and power transmission systems employing planetary gear speed ratio controlling devices although, as aforesaid, the fundamental principles of our invention may, if desired, be employed in connection with transmissions of other types including the aforesaid sliding gear types of transmissions. By way of example in connection with the aforesaid advantages of the planetary transmission over more conventional types, it may be noted that the planetary transmission, especially when used in conjunction with a fluid type of clutch between the engine and transmission, permits gear changes without the necessity of releasing the heretofore conventional main clutch between the engine and transmission so as to obtain relatively quick gear changes and faster acceleration of the motor vehicle. This is made possible by reason of the fact that the braking devices associated with the planetary gear trains may quickly operate, the fluid clutch smoothing the shock of the gear change by reason of its inherent slipping qualities.

Further objects and advantages of our invention will be apparent from the following detailed description of a preferred embodiment of our invention, reference being had to the accompanying drawings in which.

Figures 1, 2, 3, 4:
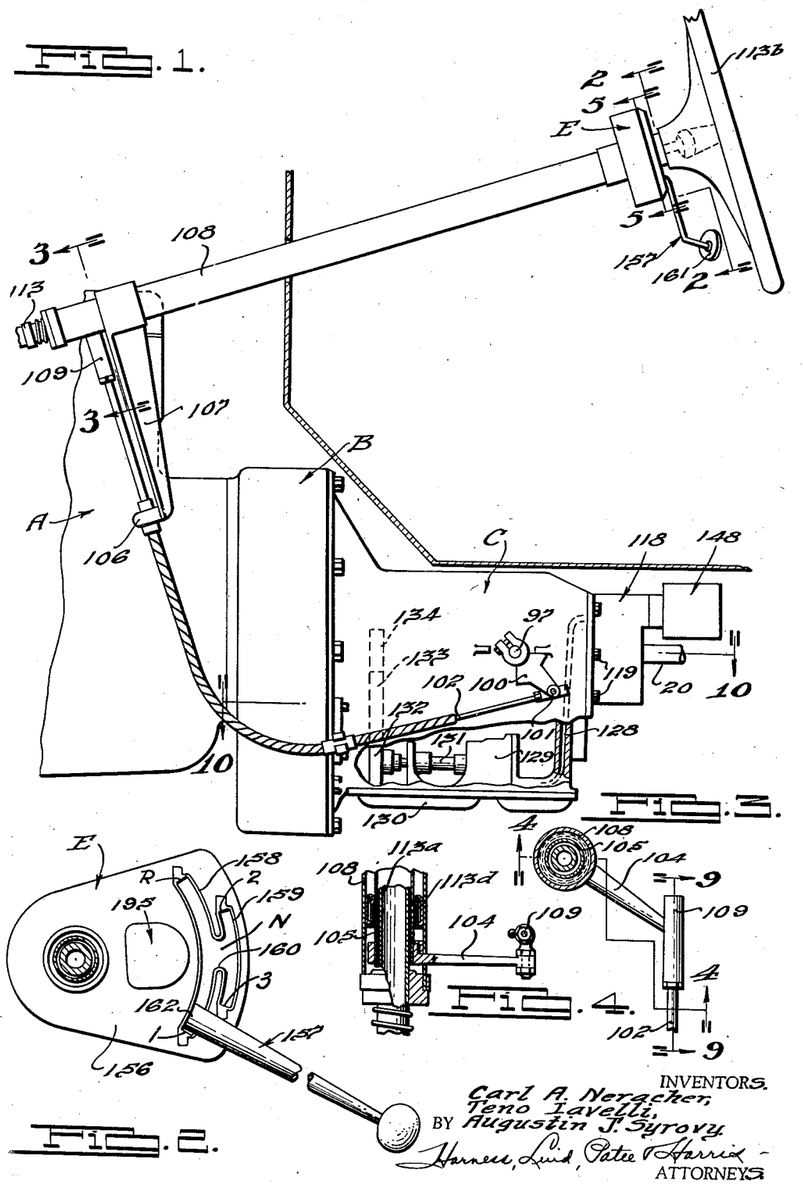
Fig. 1 is a side elevational view somewhat diagrammatic in form illustrating our power transmission mechanism as a whole, a portion of the transmission casing being broken away to illustrate the fluid pressure pump.
Fig. 2 is a sectional plan view showing the manually controlled selector element and H-plate therefor, the section being taken as indicated by line 2—2 of Fig. 1.
Fig. 3 is a detail sectional plan view along line 3—3 of Fig. 1 showing the steering post mounting for certain of the selector operating connections.
Fig. 4 is a fragmentary sectional elevational view taken as indicated by the line 4—4 of Fig. 3.

Referring to the drawings, we have illustrated our invention in connection with a motor vehicle drive, this drive including a prime mover or engine A, a portion of which is shown in Fig. 1, a main clutch B driven from the engine, and a change speed transmission or gear box C driven from the clutch B. The drive passes from the transmission through a power take-off shaft 20, which, as usual, may extend rearwardly of the vehicle to drive the usual ground wheels (not shown).

Figures 10, 11:
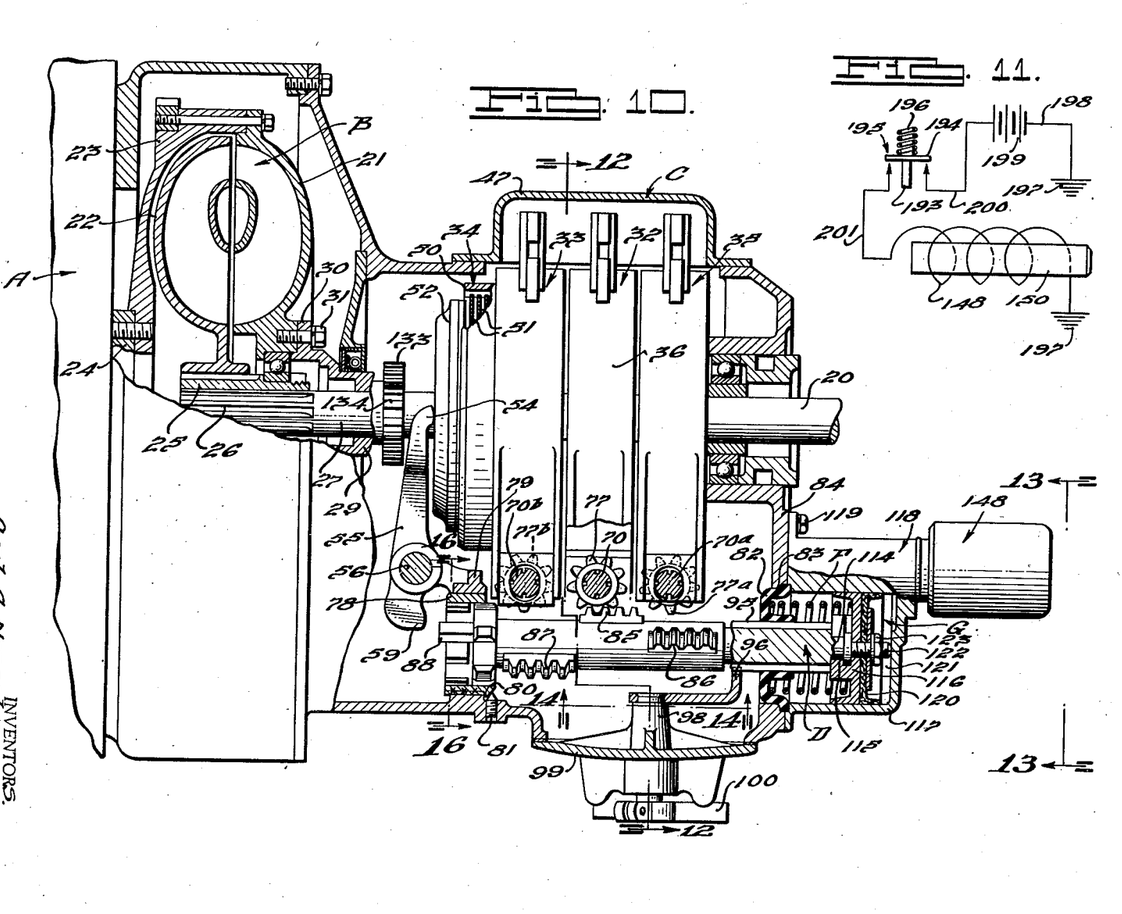
Fig. 10 is an enlarged sectional plan view through the transmission and fluid clutch.
Fig. 11 is a wiring diagram of the electrical system of control for the power operating mechanism.

The clutch B may be of any suitable construction for controlling the drive between engine A and transmission C, this clutch being illustrated in Fig. 10 in the form of a fluid coupling type having the usual driving and driven cooperating vane members 21 and 22 respectively. The driving vane member 21 is carried by the engine flywheel 23, the latter being connected as usual with the rear end of the engine crankshaft 24. The driven vane member 22 is splined to a hub 25 which in turn is splined at 26 on the forward end of the driven shaft 27. This driven shaft extends rearwardly to drive the power take-off shaft 20 through the intermediary of the various gear trains of transmission C.

Where the power means for operating the transmission is afforded by a fluid such as oil under pressure, the pump for placing the oil under pressure is preferably operated from the engine to maintain the fluid pressure even when the pump is idling. It is therefore preferred to provide a pump drive from the driving clutch member 21 rather than the drive clutch member 22 inasmuch as the latter may be stationary under certain conditions of vehicle operation such as when the vehicle is standing still with the engine idling.

This pump drive may be provided by reason of a driving sleeve or hollow shaft 29 mounted on the shaft 27 but rotatable independently thereof. The sleeve 29 has a hub or flange 30 connected at 31 with the driving vane member 21 of the clutch B so that even when the driven vane member 22 is not being operated from the driving vane member 21, the sleeve 29 will be rotatably driven from the engine crankshaft 24 and flywheel 23. The pump drive from sleeve 29 will be more apparent hereinafter.

We have illustrated the fluid type of clutch B since a clutch of this character has a number of advantages in connection with a transmission of the planetary gear type C and in further connection with our arrangement of vehicle driving controls which will be presently described more in detail. Among the advantages of the fluid type of clutch are the provision of a smooth drive for the vehicle through the planetary transmission, relatively high power driving efficiency, automatic release of the drive between the engine and transmission when the engine is idling, and with the transmission manipulated to establish one of its driving gear ratio settings, and other well known favorable characteristics. We desire to point out, however, that other types of clutches may be employed to control the drive between engine A and transmission C within the broader aspects of our invention. For example, the well known type of friction clutch may be employed and manually operated or automatically operated by the well known commercial type of vacuum clutch releasing mechanism as will be readily understood.

We have illustrated the change speed transmission C as the epicyclic or planetary type, this general form of transmission being well known in the art, and, as usual, includes a plurality of transmission speed ratio controlling clutches or brakes 32, 33, 34 and 35, these braking controlling devices being respectively adapted to actuate the transmission in its first speed ratio or low gear, second speed ratio or intermediate gear, third speed ratio or direct drive, and reverse drive. Other speeds may be provided as desired.

Figure 12:
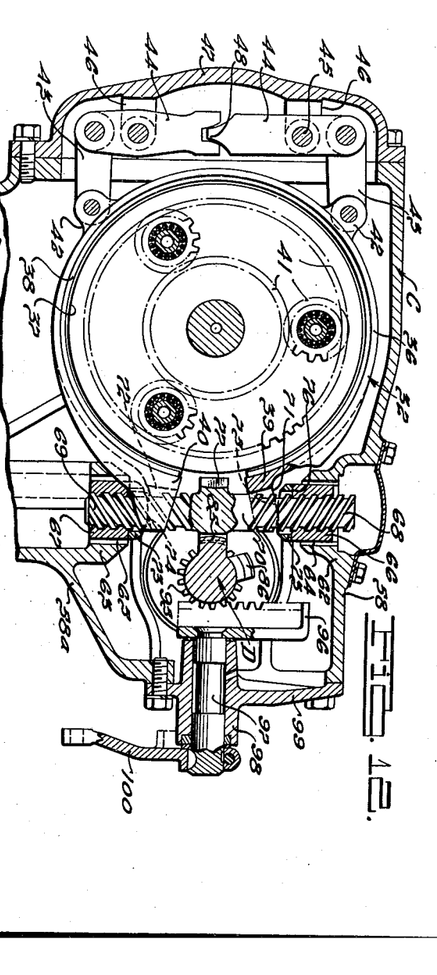
Fig. 12 is a sectional elevational view through the transmission illustrating one of the speed ratio controlling devices and parts associated therewith, the section being taken along line 12—12 of Fig. 10.

The typical brake device 32 illustrated in Fig. 12 consists of an outer band 36 which substantially surrounds the rotary element or drum 37, the band being provided with friction braking material 38 carried by the band and adapted for frictional engagement with the drum 37. The band 36 has its ends formed with laterally projecting actuating flanges 39 and 40 positioned adjacent each other, means being provided to move the band ends toward each other to contract the band 36 for causing the friction material 38 to brake rotary drum 37, the band having sufficient inherent resilience to expand away from contact with the drum when the actuating means is relieved at the flanged ends 39 and 40. In Fig. 12 the low speed ratio braking device 32 is illustrated in its inoperative position whereby the drum 37 is free to rotate through operation of the planetary gear set 41 somewhat diagrammatically illustrated in association with the drum 37. When the braking device 32 is actuated by contracting the band 36, the drum 37 is held against rotation, the driven shaft 20 in such instance being operated through the planetary gearing 41 to provide the low speed drive for the motor vehicle.

In order to anchor the band 36 and to substantially equalize the braking forces applied to drum 37 around the periphery thereof and thereby substantially avoid a tendency toward lateral loading of the drum and planetary gearing transverse to the axis of the drum, we have provided the band with a circumferentially spaced pair of anchoring flanges 42. These flanges are connected through links 43 with the levers 44 pivotally mounted at 45 with the supporting bracket 46 of the transmission side cover casing 47, the levers 44 being interlocked at 48 so that movement of one of the flanges 42 will be transmitted through the pivotal levers 44 and the links 43 to the other portion of the band associated with the anchoring device. The links 43 are thus pivotally connected at their opposite ends respectively with the anchors 42 and levers 44.

The third speed clutching controlling device 34 is arranged for a direct drive through the transmission and differs somewhat from the braking devices 32, 33 and 35 in that the controlling device 34 has its rotary controlling element 50 adapted for clutching action in a well known manner by frictional engagement through the discs 51 by an axially movable clutching member 52. The latter clutching member is thus engaged by the yoked end 54 of an actuating lever 55 pivotally mounted by a pin 56 suitably supported in the transmission casing. On the opposite side of pivot 56 the lever 55 is provided with a step actuating portion 59, the purpose of which will presently be more apparent.

The transmission casing portions 58 and 58ª are respectively provided with the vertically spaced inwardly extending supporting brackets 62 and 63, respectively, these brackets being formed with coaxial splined openings 64 and 65, respectively. Splined within these openings are the nuts 66 and 67 which are axially and oppositely threaded to receive the correspondingly threaded ends 68 and 69 of an operating oscillatory shaft or screw 70.

The shaft 70 extends through openings 71 and 72, respectively, formed to open laterally in the aforesaid band ends 39 and 40, these openings having considerable clearance with shaft 70 so as not to bind on the shaft when the band is contracted and expanded. In order to transmit the thrust of the nuts 66 and 67 to the flanges 39 and 40 so as to relieve distorting loads on the shaft 70 and parts associated therewith, each nut operates a sleeve 73 having a curved face 74 engaging a curved face 75 of band end 39 or 40. The engaged curved faces 74 and 75 provide a rocking freedom of action, each sleeve 73 having a clearance indicated at 76 with the shaft 70.

The operating shaft 70 of the low speed braking device 32 has its portion thereof intermediate the band ends 39 and 40 formed with a gear 77, the means for oscillating shaft 70 through the gear 77 being hereinafter more particularly described.

In the operation of the low speed controlling device 32 as thus far described, it will be apparent that when the shaft 70 is given a rotary movement, such movement operates through the oppositely threaded ends 68 and 69 of the shaft 70 to cause the nuts 66 and 67 to move inwardly toward each other in their splined openings 64 and 65 respectively, this movement acting through the sleeves 73 to contract the band ends 39 and 40 whereby the low speed drum 37 has its rotation checked for establishing the low speed drive through the transmission. When the shaft 70 is rotated in the opposite direction, the nuts 66 and 67 are moved away from each other and the band 36 is expanded to permit the drum 37 to again rotate and thereby relieve the drive through the transmission controlling device 32.

In order to avoid repetition we have not illustrated all of the details of the brake operated means associated with the controlling devices 33 and 35, it being understood that such operating means are similar to that described in connection with the controlling device 32. For convenience of reference the operating shaft or screw for the reverse speed braking device is designated at 70a and the corresponding shaft for the second speed braking device 33 is designated as 70b. The gears associated with these screw shafts are respectively designated as 77a and 77b. As will be more apparent presently, the gears 77, 77a and 77b and lever end 59 are adapted to be selectively operated in order to selectively control the engagement and release of the respective speed ratio controlling devices 32, 35, 33 and 34.

We will next describe the common operating means or selector operating element which is adapted for selective engagement under manual control with the aforesaid screw gears, 77, 77a and 77b for respectively operating the speed ratio controlling devices 32, 35 and 33; also for operating the direct or third speed controlling device 34; and also for establishing a neutral condition in the transmission.

The transmission casing is adapted to support a pair of axially aligned bearings for receiving the reciprocating and oscillating rack or actuating shaft D. The forward bearing is provided by a bushing 78 non-rotatably received in an opening of a casing support bracket 79, the bushing being held against axial displacement forwardly by a bushing projection 80 and rearwardly by the set screw 81. The rear bearing is provided by a member 82 which is disposed in a suitable opening 83 in the rear end wall 84 of the transmission casing. The rear end of the actuating shaft D is also supported by a piston for reciprocating the shaft and which will presently be referred to in detail.

This actuating shaft D has a series of teeth forming a rack adapted to be brought into operative association with each of the screw gears, these racks being designated at 85, 86 and 87 for respectively operating the screw gears 77, 77a and 77b. The forward end of shaft D is further provided with a third speed actuating projection 88 adapted for engagement with the lever shoulder 59 for operating the third speed controlling device 34. It will be noted that the racks and projection 88 are longitudinally spaced along the shaft D and that they are also spaced circumferentially of the shaft whereby upon progressive rotation of the shaft only one of the racks and the projection 88 will engage its associated screw gear or lever 55 at any time.

In Figs. 10 and 12 it will be noted that the shaft D is positioned so that the low speed rack 85 is in position for operating the low speed gear 77 and when the shaft D is moved forwardly or to the left as viewed in Fig. 10, the low speed screw 70 will be rotated to cause the aforesaid braking operation of the low speed controlling device 32 to cause the low speed drive to take place through the transmission. It will furthermore be noted that with the low speed rack 85 in the position illustrated, the remaining racks 86, 87 as well as projection 88 are free from engagement with their respective associated gears 77a, 77b and the lever 55. From Figs. 10 and 16 it will be noted that the shaft D has a space longitudinally and circumferentially between the second speed rack 87 and the direct projection 88, this space being designated as the neutral space "N" so that when the shaft is positioned with this space facing the screw gears, each of the racks as well as projection 88 will be free from contact with their associated screw gears and lever 55 and the transmission will be in neutral at which time the various braking devices 32, 33, 34 and 35 are released.

Figures 13, 14, 15, 16:
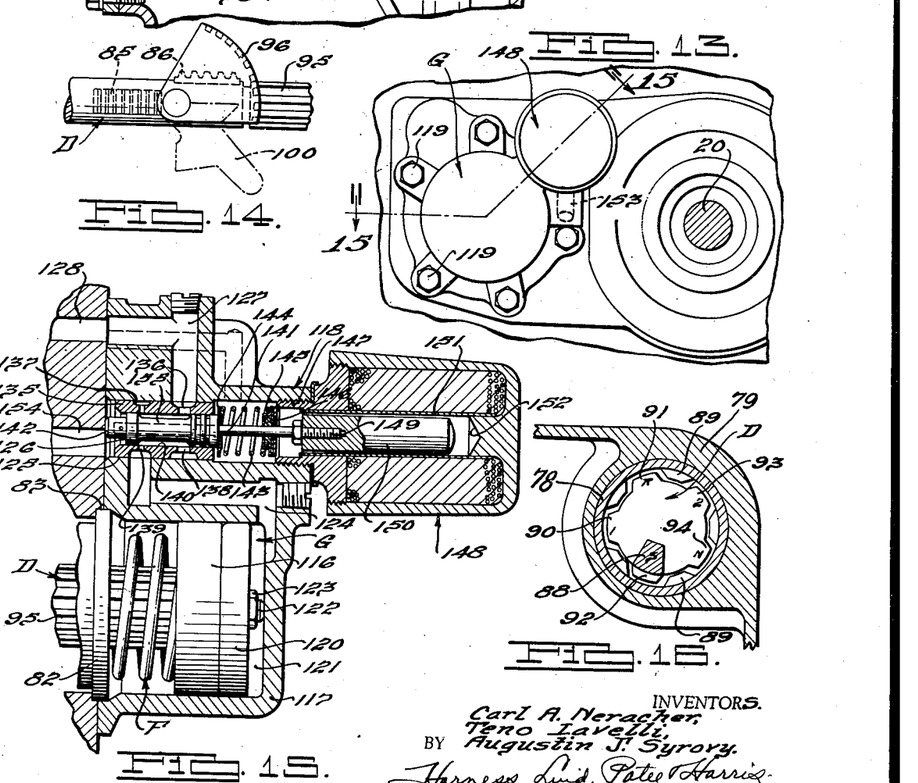
Fig. 13 is a rear elevational view illustrating the housing mechanism for the fluid pressure operator and control valve, the view being taken as indicated by line 13—13 of Fig. 10.
Fig. 14 is a detail sectional elevational view taken along line 14—14 of Fig. 10.
Fig. 15 is an enlarged sectional view taken as indicated by line 15—15 of Fig. 13.
Fig. 16 is a detail sectional view taken along line 16—16 of Fig. 10.

In order to insure proper selective rotation of the shaft D prior to reciprocating action thereof, bushing 78 has a series of internal lugs 89 spaced to receive projections 90 to 94, inclusive, these projections being respectively longitudinally aligned with racks 85, 86, projection 88, rack 87, and the neutral space. In Fig. 16 these projections also bear legends 1, R, 3, 2 and N respectively corresponding to the functions of control of the aligned racks, projection and space aforesaid. Only when the shaft D is properly adjusted to align the projections with the spaces between lugs 89 can the shaft D be reciprocated for its power stroke.

In order to selectively rotate the rack D for selectively engaging the racks and projection 88 thereof with the respective screw gears and lever 55, and also for axially operating the shaft in the various positions of selective adjustment, the following mechanism is provided.

Rearwardly adjacent the reverse rack 86, the shaft D is provided with a circular rack or gear 95 meshing with the segmental rack 96 rotatably fixed with a shaft 97 best shown in Figs. 12 and 14, this shaft being rotatably journalled by a bearing 98 carried by the transmission side cover 99. The shaft 97 has fixed thereto, outwardly of the transmission cover, a lever 100 connected at 101 (see Fig. 1) to a Bowden wire operating mechanism 102 which extends forwardly for pivotal connection with the ball end 103 of a lever assembly 104 secured to the tubular operating shaft 105 as shown in Fig. 4.

The forward end of the Bowden wire mechanism 102 has a guide 106 provided by a bracket 107 rigidly secured to the outer stationary tubular housing 108 comprising the steering post, as best shown in Fig. 1.

A yielding connection is preferably provided at some convenient point between the manual selector element, which will be shortly described, and the sector 96 for rotatably adjusting the shaft D. We have illustrated this yielding connection in Fig. 9 intermediate the lever ball end 103 and the forward end of the Bowden wire mechanism 102. The wire 102 is anchored at its forward end to the housing 109 provided with the pre-loaded oppositely acting springs 110 and 111 which respectively act against the ball seats 112 and 113. The springs 110 and 111 have sufficient rigidity so that normally they provide a rigid connection between lever 104 and Bowden wire 102. However, if for any reason the manually operated adjusting mechanism for the shaft D should bind at any point, the mechanism will be protected during any manual adjustment of lever 104 under such conditions by reason of the ability of springs 110 and 111 to yield. The yielding connection also permits movement of the manual control mechanism sufficiently to unload the rack D during speed ratio selecting operations as will presently be more apparent. This yielding connection is therefore in the nature of a safety device for the manually controlled selector operating mechanism and also functions during speed selections.

Rotatable within the hollow shaft 105 is the hollow steering shaft 113a operably connected at its upper end to a steering wheel 113b and adapted for operable connection at its lower end to the usual steering mechanism for the front ground wheels of the motor vehicle (not shown). The hollow operating shaft 105 is rotatably journalled by upper and lower bearings 113ᶜ and 113ᵈ, and extends upwardly to a point preferably just below the steering wheel 113ᵇ to conveniently position the manually controlled device E for selectively controlling or manipulating the transmission speed ratios as will presently be more apparent.

Returning now to Fig. 10, the selector rack shaft D has its rear end adjacent the circular rack 95 provided with a groove 114 adapted to receive the flange 115 of the fluid pressure operating piston assembly 116 which reciprocates in the cylinder 117 which is a part of a casting 118 best illustrated in Figs. 13 and 15 as attached at 119 to the rear wall 84 of the transmission. The piston 116 provides the actuating member of the power operating means G for moving shaft D under power to engage the various brake bands and the direct speed clutch 34.

For yieldingly urging the rack shaft D to the right or rearwardly to release the speed ratio controlling devices, we have provided prime mover means F preferably in the form of a compression coil spring surrounding the rear end portion of shaft D between the fixed abutment provided for the bearing member 82 and acting on piston 116. In Fig. 10 it will be noted that the bearing member 82 is conveniently held in position by clamping the same between the rear casing wall 84 of the transmission and the casting assembly 118.

The piston 116 has the flexible sealing cup 120 adapted to seal the piston against escape of the fluid forwardly of the cylinder 117, the cup 120 bearing against the walls of the cylinder under the action of the fluid pressure introduced to the pressure chamber 121. The sealing cup is held in place by the rearwardly extending threaded reduced end 122 of shaft D together with the fastener or nut 123. Fluid, such as oil under pressure, is introduced to the pressure chamber 121 as best shown in Fig. 15, through a passage 124 leading to the valve controlled chamber or cylinder 125 which slidably receives the fluid pressure supply controlling valve 126.

The cylinder 125 is supplied with oil under pressure through a passage 127 which receives the oil by a conduit 128 formed in the transmission casing casting. The conduit 128, as best shown in Fig. 1, leads to the delivery side of a suitable pump 129 driven from its location in the oil storing sump or reservoir 130 of the transmission casing by reason of the shaft 131 provided at its forward end by a driving gear 132. This gear meshes with an idler gear 133 which in turn meshes with the driving pinion 134 (see Fig. 10) carried on the rear end of the driving sleeve 29 which, as aforesaid, is fixed to the fluid impeller 21.

A valve guide porting member 135 is pressed into the cylinder 125 so as to be fixed therewith, this porting member having annular conduits 136 and 137, respectively, communicating with the passages 127 and 124. The annular passages 136 and 137 are also respectively provided with the inwardly extending ports 138 and 139 adapted for control by the valve 126. This valve has a sliding fit within the cylindrical bore 140 of the porting member 135 and extending axially through the valve with sufficient clearance to prevent binding thereof, is a valve operating rod 141 preferably of brass or other non-magnetic material. The rod 141 extends forwardly of valve 126 and is provided with a stop 142 adapted to limit forward movement of valve 126 under the influence of a spring 143 which operates between the valve spring abutment 144 and a rear fixed abutment 145, the latter having associated therewith the fluid pressure sealing washers 146 acting against the threaded stem 147 of the electrical solenoid 148.

The rear end of valve operating rod 141 is connected at 149 with the armature 150 of solenoid 148, the armature being adapted for reciprocation in the solenoid cylinder 151 having the rear abutment 152. Any fluid which may leak rearwardly beyond the valve 126 is adapted to drain downwardly from the portion of casting 118 which encloses the valve operating spring 143 by reason of the drain conduit 153, this conduit then extending forwardly to the main body of the transmission where the oil is permitted to drain back to the reservoir 130. A further conduit 154 is adapted to return the oil from operating cylinder 121 back to the reservoir, this conduit 154 opening rearwardly to the forward end of valve 126.

The valve 126 has the reduced valving portion 155 adapted to place the conduits 127 and 124 in communication when the valve is in its forward position under the influence of spring 143. In the drawings, the parts are shown in their positions for operating the low speed controlling device 32, the valve 126 being positioned forwardly so that the fluid pressure is just being delivered from the supply conduit 127 to the conduit 124 and the pressure chamber 121 of the cylinder 117. When the valve 126 moves rearwardly under the influence of solenoid 148, as will be presently more apparent, the spring 143 will be compressed and the reduced portion 155 of the valve will no longer provide communication between conduits 127 and 124. At such time the conduit 124 will be open through the port 139 to the discharge conduit 154 for returning the oil from the pressure chamber 121 back to the reservoir 130. When the valve 126 moves forwardly under the influence of spring 143, the reduced valve portion 155 affords communication between conduits 127 and 124 to supply fluid pressure from the pump 129 to operate the piston 116 and selector rack shaft D forwardly for actuating one of the speed ratio controlling devices 32, 33, 34 or 35, depending on the rotative selective adjustment of the selector rack shaft, as will be presently more apparent.

The function and operation of the manually controlled selector mechanism E in relation to the selector rack shaft D will now be further described.

The mechanism E comprises an H-plate housing 156 for the manually operable selector element or change speed operating lever structure 157, the H-plate comprising the elongated slot 158, the relatively shorter slot 159 adjacent thereto, and the communicating cross over or neutral gate slot 160. Slots 158 and 159 extend in the same general direction and are approximately parallel with each other, although they have a slight curvature about the axis of steering post 108 as a center.

The ends of slots 158 and 159 provide stations of selective control of the transmission by lever 157, these being designated in Fig. 2 as 1, 2, 3 and R; the neutral position at gate 160 being designated as N. The mechanism is so arranged that longitudinal movements of lever 157 in slots 158 and 159 control rotation of shaft D and hence the selective operative connection of this shaft with the various transmission control devices 32 to 35, or neutral. Thus, as lever 157 moves from the illustrated position at first or low speed to reverse, the hollow shaft 105 and lever 104 are successively swung through the positions shown in dotted lines in Fig. 5 designated as 3, N, 2 and R for the lever 157. It is for this reason that slot 158 is made longer than slot 159 so that all of the control stations are included in the limits of longitudinal travel of lever 157. Of course, to select stations 2 or 3, the lever must be moved through N and into slot 159 and we have also provided a novel single switch automatic control so that in shifting from N to R or 1, the transmission will not be operated for stations 2 or 3 although these are intermediate the longitudinal swinging limits of lever 157.

At some point in its general radial length, lever 157 has provision for radially sliding movement to negotiate the neutral gate 160, and to this end our novel mounting means and lever structure is arranged as follows. The outer end of lever 157 has handle or knob 161, the lever extending inwardly to the plate 156 where the lever is bent at 162 to enter the H-plate. The lever then has a forked end portion 163, 164 slidably receiving the inner lever part or lever mounting member 165 which is rigidly secured to the shaft 105. Member 165 is formed with parallel slots or guideways 166, 167 for slidably receiving the rounded enlarged portions of lever ends 163, 164. One of these rounded portions is shown at 168 in Fig. 7. This mounting for the inner end of the lever provides radial shifting of lever 157 to move lever part 162 in the neutral slot 160 without rotating shaft 105, the lever portions 168 sliding in guideways 166, 167.

In order to limit outward movement of lever 157 radially from the shaft 105, the forked portion 164 carries a pin 169 engageable with a shoulder 170 on the member 165, inward movement being limited by lever portion 171 engaging member 165. Of course, the lever part 162 operating in slots 158 and 159 would also limit radial shifting of lever 157 but the additional stops are preferably provided to permit the removal and assembly of housing 156 while maintaining the lever assembled in position.

Lever portion 171 is recessed at 172 to house a spring 173 which thrusts against member 165 and yieldingly urges lever 157 outwardly to engage slot 159 for ease of shifting from 1 to 2 and to prevent accidental shift into R.

The rounded lever portions 168 also permit lever 157 to have a limited to and fro rocking movement about the portions 168, it being noted that forks 163 and 164 have sufficient clearance in guide-ways 166 and 167 to permit this lever movement. This movement thus takes place about an axis which is approximately perpendicular to the axis of shaft 105, the lever portion 162 moving slightly upwardly and downwardly in the H-slot (with the lever mounted as illustrated) without accompanying rotation of shaft 105.

Figures 5, 6:
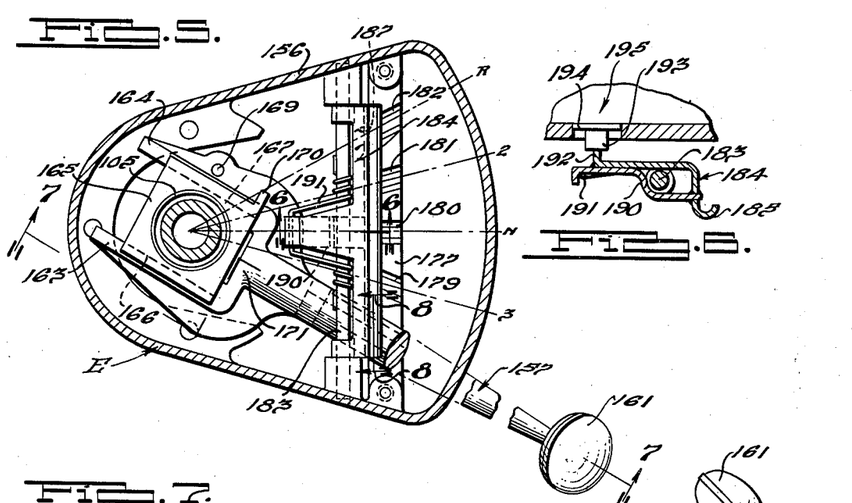
Fig. 5 is a sectional plan view of the manually controlled selecting mechanism taken along line 5—5 of Fig. 1.
Fig. 6 is a detail sectional view taken along line 6—6 of Fig. 5.

The intermediate lever portion 174 supports a pin 175 on which is journalled the cylindrical roller 176 having its axis disposed radially from the axis of shaft 106. Roller 176 engages a bar 177 fixed at its ends to the side walls of casing 156, this bar having radially extending notches 178, 179, 180, 181 and 182, respectively receiving the roller when lever 157 is positioned for 1, 3, N, 2 and R as best seen in Fig. 5. When roller 176 enters one of these notches, the lever swings slightly downwardly about pivots at 168 for the depth of the notch. The side walls of casing 156 support a pivot pin 183 on which is swingingly mounted the switch controlling member 184 which is provided with a lever contacting rounded marginal portion 185 which is formed with a pair of transversely spaced, radially extending notches 186 and 187, respectively in radial alignment with the low speed and reverse notches 178 and 182 of the bar 177. Thus, when lever 157 is adjusted to stations 1 or R the roller 176 will respectively engage notches 178 and 182 of bar 177 and the lever will at the same time be respectively aligned and engaged with the notches 186 and 187 of the swinging switch operated member 184.

Figures 7, 8, 9:
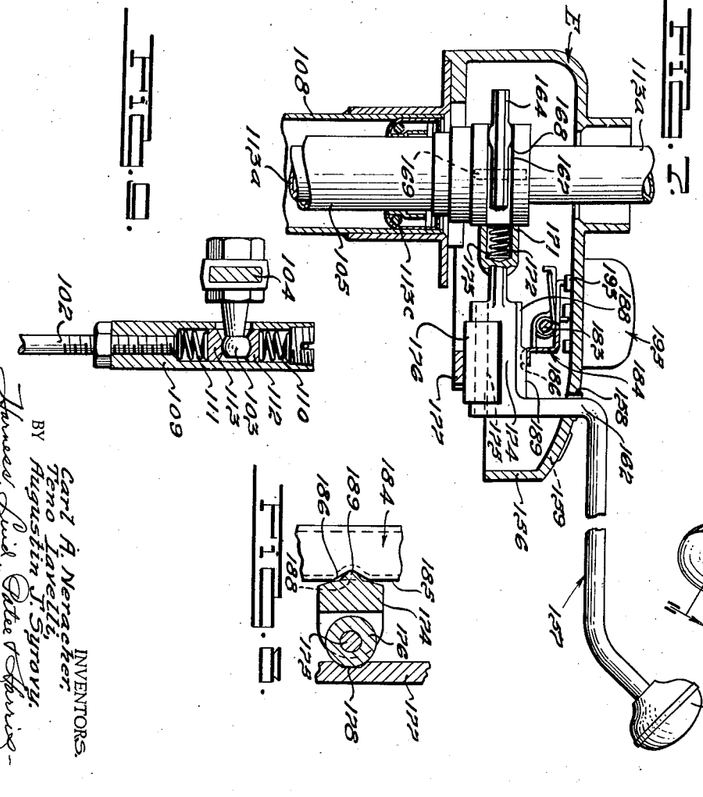
Fig. 7 is a sectional elevational view of the Fig. 5 mechanism taken along line 7—7 of Fig. 5.
Fig. 8 is a detail sectional view taken along line 8—8 of Fig. 5.
Fig. 9 is an enlarged sectional view taken along line 9—9 of Fig. 3.

The intermediate portion 174 of lever 157 has its upper face stepped at 188 and 189, the arrangement being such that when lever 157 is shifted inwardly toward its mounting on shaft 105 to register with slot 158 as illustrated in Fig. 7, lever portion 189 will engage the face 135 of switch operating member 184 and when lever 157 is shifted radially outwardly, assisted by spring 173, to engage slot 159 then lever portion 189 moves outwardly away from contact with the switch operating member 184, the latter then being engaged by the lever portion 188. Roller 176 has sufficient radial length so that it will always contact with the bar 177 in all shifting positions of lever 157 when moved radially as well as along the H-slots 158 and 159.

The swinging member 184 may be formed of sheet metal and we have re-enforced this member by a centrally disposed plate member 190 which is welded at its portions of contact with the main body portion of the swinging member 184. In order to at all times yieldingly urge the face 185 downwardly into engagement with one or the other of lever portions 188 or 189, we have provided a spring 191 which has its ends coiled about the pivot pin 183, this spring therefore producing a swinging movement of the member 184 about the axis of the pivot pin 183.

The member 184 provides a swinging lever having the lever engaging face 184 at one end thereof, the other end of the lever having a portion 192 which is in continuous engagement with the insulated stem 193 of the switch conductor plate 194 of the electrical switch generally designated at 195 as best shown in Figs. 6 and 11. The switch 195 is normally held open whenever lever 157 is positioned at one of its stations of control by reason of a slight downward swinging movement of lever 157 as roller 172 enters one of the notches of bar 177, such swinging movement of lever 157 permitting switch operating member 184 to swing about pin 183 under the influence of spring 191 to cause the portion 192 to open the switch against the action of a relatively light spring 196. Whenever the lever 157 is moved from one of its stations of transmission control, the switch operating member 184 will be rocked in the opposite direction during the first part of the shifting movement of the lever as roller 176 leaves one of the notches of bar 177, spring 196 then acting to close switch 195, the switch remaining closed until lever 157 is adjusted to another of its stations of transmision control according to the desires of the operator.

Referring to the wiring diagram illustrated in Fig. 11, the electrical circuit may be considered as starting at the ground 197 and thence through the conductor wire 198 to the source of electrical energy such as the storage battery 199. From this battery the circuit extends along wire 200 then across the switch conductor plate 194 to the wire 201 and the solenoid 148 for operating the solenoid armature 150.

Assuming that lever 157 is shifted outwardly through the neutral slot 160 and into the second and third speed slot 159, movement of the lever between the limits of this slot will cause the lever portion 188 to engage the face 185 of switch operating member 184 so that whenever the lever 157 engages one of the notches 179, 180 or 181, the selector lever will swing downwardly sufficiently to permit rocking movement of switch operating member 184 to open the switch 195. Immediately on being moved from one of these notches, the selector lever 157 will be swung upwardly sufficiently to rock the switch operating member 184 against the spring 191 and thereby permit spring 196 to close the switch 195, the switch remaining closed until the selector lever is manipulated to cause its roller 176 to enter another of the notches of bar 177.

Now let it be assumed that the selector lever is shifted inwardly toward its support and through the neutral slot 160 for travel along the low and reverse slot 158. This inward shifting movement of the lever at the neutral slot 160 will bring the lever portion 189 into engagement with the switch operating member 184 thereby rocking this member to close switch 195 and energize solenoid 148. When moving the lever 157 along slot 158 to the end of this slot for controlling the low speed ratio, this position being illustrated in Fig. 2, it is desirable to permit the selector lever to move from the neutral slot all the way to the low speed station without permitting the switch 195 to close during this lever travel when the roller 176 passes across the third speed notch 179 since otherwise the transmission would be momentarily operated in the third speed drive in shifting from neutral to low speed. Likewise it is desirable when shifting from neutral to reverse to prevent the switch 195 from momentarily closing as the roller 176 moves across the notch 181 for the second speed control. Our novel arrangement will prevent these undesired operations of switch 195.

Assuming, for example, that the selector lever 157 is moved from neutral to low, it will be apparent that the lever stepped portion 189 is sufficiently high relative to lever portion 188 so that even though the roller 176 enters the third speed notch 179, the resulting downward swinging movement of lever 157 will not be sufficient to swing the switch operating member 184 by its spring 191 for closing the switch 195. However, when lever 157 is fully moved to engage roller 176 with the low speed notch 178, then at such time lever portion 189 also engages the notch 186 in the face 185 to thereby permit a further swinging movement of the switch operating member 184 sufficiently to close the switch 195. In this manner the switch is maintained in its open position during shifting of the lever from neutral to low and yet is permitted to be opened when the shifting lever is fully moved to its low speed position. Just as soon as the shifting lever is moved so that roller 176 leaves notch 178, lever portion 189 will then leave notch 186 and the switch 195 will be closed and will remain closed until the selector lever is manipulated to another of its stations of control.

In similar manner, when the selector lever 157 is shifted from neutral to reverse, lever portion 189 will hold the switch 195 closed even though roller 176 enters the second speed notch 189 so that the transmission is not operated in the second speed during the shifting operation. When the selector lever is fully positioned at the end of slot 158 for causing the roller 176 to enter the reverse notch 182, then at such time the lever portion 189 will also engage the slot or notch 187 to then permit the switch operating member 184 to swing sufficiently to open the switch 195 for causing operation of the transmission in the reverse driving direction.

Our manually controlled selector operating mechanism is practically instantaneous in its response to selective adjustment of lever 157 and the different selections may be made as rapidly as desired. In the general operation of the selector mechanism E for changing the transmission speed ratio, the operator moves the selector lever from one of the stations at the switch H-plate. Just as soon as the selector lever is so moved, the switch 195 will be closed thereby inducing an electrical circuit through the windings of solenoid 148 for causing the solenoid armature 150 to move rearwardly. This rearward movement of the solenoid armature will adjust the valve 126 rearwardly to place the fluid chamber 121 of cylinder 117 in communication with the reservoir discharge conduit 154 whereupon the spring F will move the shaft D rearwardly to release any of the controlling devices 32 to 35 which may have been in operation. This entire phase of the operation takes place very quickly during the initial part of adjustment of the selector lever from any of its stations including the neutral station N.

It should be noted at this point that the initial part of the adjustment of the lever 157, as aforesaid, is permitted to take place by the yielding connection between lever 104 and the Bowden wire 102. Thus, even though shaft D is in a position of actuation for one of the controlling devices, the lever 157 may be initially moved relative to shaft D sufficiently to cause actuation of the solenoid 148 to immediately move shaft D rearwardly to release any controlling device, further movement of lever 157 rotating shaft D to any desired selective new position.

When the selector lever is moved to a new station it will be apparent that the switch 195 will be opened thereby interrupting the electrical circuit through the solenoid 148. At such time the spring 143 will immediately act to move the valve 126 and armature 150 forwardly to establish communication between the fluid pressure supply conduit 127 and the pressure chamber 124. This will immediately cause a forward movement induced by the fluid pressure on the shaft D for operating one of the selector controlling devices which may have been selected for the new position or else for operating shaft D without causing any movement of any of the speed ratio controlling devices in the event that neutral was selected.

Referring to the aforesaid cycle of operation and to the point where selector lever 157 is moved from one of the stations preparatory to movement thereof into a newly selected station, just as soon as the solenoid armature 150 moves rearwardly to operate valve 126 to vent the pressure chamber 121, it will be apparent that the fluid pressure load is removed from the shaft D which is now in its rearward position so that longitudinally arcuate movements of lever 157 in slots 158 or 159 will cause oscillatory movement of operating shaft 105 and the ball end 103 of lever 104, lever 104 operating through the Bowden wire mechanism 102 and sector 96 to rotatably adjust the shaft D into a new position for actuation of one of the speed ratio controlling devices. The mechanism operates almost instantaneously so that there is little resistance to adjustment of selector lever 157 from a position at any station and any binding tendency experienced at the shaft D will be taken up yieldingly through the Bowden wire connection at 109.

While we have described our manual selector element as shiftable in an H-shaped path to the various stations of transmission control, we desire to point out that this reference to the path shape is used generally, it being obvious that the number of stations and their relative positions may cause some variant in the particular shape of path movement. Omitting the second speed drive, for example, would obviously result in omitting the second speed "arm" or "leg" of the H-slot.

Various modifications and changes will be apparent from the teachings of our invention, as defined in the appended claims, and it is not our intention to limit our invention to the particular details of construction and mode of operation shown and described for illustrative purposes.

We claim:

1. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements along adjacent paths of corresponding direction but of relatively different length and for displacement toward said mounting means for shifting movements of said selector element along a path transversely connecting said adjacent paths of different length, electrically controlled means for controlling the operation of one of said operating means, and electrical switch means actuated in response to shifting movements of said selector element along said adjacent paths for controlling energization of said electrically controlled means.

2. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements along adjacent paths of corresponding direction but of relatively different length and for displacement toward said mounting means for shifting movements of said selector element along a path transversely connecting said adjacent paths of different length, electrically controlled means for controlling the operation of said power operating means, and electrical switch means actuated in response to shifting movements of said selector element along said adjacent paths for controlling energization of said electrically controlled means.

3. In a motor vehicle transmission of the planetary gear type having a plurality of planetary gear operated rotary controlling elements for respectively controlling the driving to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movement along adjacent paths of corresponding direction but of relatively different length and for displacement toward said mounting means for shifting movements of said selector element along a path transversely connecting said adjacent paths of different length, electrically controlled means for controlling the operation of said power operating means, electrical switch means actuated in response to shifting movements of said selector element along said adjacent paths for controlling energization of said electrically controlled means, and means including a Bowden wire mechanism operably connecting said selector element with the other of said operating means.

4. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements along adjacent paths of corresponding direction but of relatively different length and for displacement toward said mounting means for shifting movements of said selector element along a path transversely connecting said adjacent paths of different length, electrically controlled means for controlling the operation of one of said operating means, electrical switch means actuated in response to shifting movements of said selector element along said adjacent paths for controlling energization of said electrically controlled means, and shifting movement transmitting means operably connecting said selector element with the other of said operating means.

5. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements along adjacent paths of corresponding direction but of relatively different length and for displacement toward said mounting means for shifting movements of said selector element along a path transversely connecting said adjacent paths of different length, electrically controlled means for controlling the operation of one of said operating means, electrical switch means actuated in response to shifting movements of said selector element along said adjacent paths for controlling energization of said electrically controlled means, and yielding operating means operably connecting said selector element with the other of said operating means so constructed and arranged as to provide shifting movement of said selector element from one of said stations to another with delayed operation of the last said operating means.

6. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, valving means controlling communication between a source of fluid under pressure and said fluid power operating means, means for mounting said selector element for shifting movements along adjacent paths of corresponding direction but of relatively different length and for displacement toward said mounting means for shifting movements of said selector element along a path transversely connecting said adjacent paths of different length, and means for controlling operation of said valving means in response to shifting movements of said selector element along said adjacent paths.

7. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, valving means controlling communication between a source of fluid under pressure and said fluid power operating means, means for mounting said selector element for shifting movements along adjacent paths of corresponding direction but of relatively different length and for displacement toward said mounting means for shifting movements of said selector element along a path transversely connecting said adjacent paths of different length, solenoid means for operating said valving means, and electrical switch means actuated in response to shifting movements of said selector element along said adjacent paths for controlling energization of said solenoid means.

8. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, valving means controlling communication between a source of fluid under pressure and said fluid power operating means, means for mounting said selector element for shifting movements along adjacent paths of corresponding direction but of relatively different length and for displacement toward said mounting means for shifting movements of said selector element along a path transversely connecting said adjacent paths of different length, means for controlling operation of said valving means in response to shifting movements of said selector element along said adjacent paths, and means operably connecting said selector operating means with said selector element.

9. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, valving means controlling communication between a source of fluid under pressure and said fluid power operating means, means for mounting said selector element for shifting movements along adjacent paths of corresponding direction but of relatively different length and for displacement toward said mounting means for shifting movements of said selector element along a path transversely connecting said adjacent paths of different length, solenoid means for operating said valving means, electrical switch means actuated in response to shifting movement of said selector element along said adjacent paths for controlling energization of said solenoid means, and means operably connecting said selector operating means with said selector element.

10. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, said power operating means including a common selector operating member adapted for selective operative connection with said plurality of element engaging means, a selector element manually shiftable to a plurality of stations of transmission control respectively corresponding to said plurality of forward driving speeds and reverse for controlling the operation of said power operating means, means for controlling adjustment of said common operating member in response to shifting of said selector element, and means for mounting said selector element for shifting movements along adjacent paths of corresponding direction but of relatively different length and for displacement toward said mounting means for shifting movements of said selector element along a path transversely connecting said adjacent paths of different length.

11. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, said power operating means including a common selector operating member adapted for selective operative connection with said plurality of element engaging means, a selector element manually shiftable to a plurality of stations of transmission control respectively corresponding to said plurality of forward driving speeds and reverse for controlling the operation of said power operating means, means for controlling adjustment of said common operating member in response to shifting of said selector element, and means for mounting said selector element for shifting movements along adjacent paths of corresponding direction but of relatively different length and for displacement toward said mounting means for shifting movements of said selector element along a path transversely connecting said adjacent paths of different length, electrically controlled means for controlling operation of said power operating means, and electrical switch means actuated in response to shifting movements of said selector element along said adjacent paths for controlling energization of said electrically controlled means.

12. In a motor vehicle speed ratio changing transmission, a plurality of speed ratio controlling devices, power operating means for operating said devices, selector means for selectively operably connecting said power operating means with said devices, a manually shiftable selector element, means operably connecting said selector element with said selector means for manipulating the latter by said selector element, and means for mounting said selector element for shifting movements along adjacent paths of corresponding direction but of relatively different length and for displacement toward said mounting means for shifting movements of said selector element along a path transversely connecting said adjacent paths of different length, said connecting means including an operating member moved to and fro in response to shifting movements of said selector element along said adjacent paths, said operating member being selectively positioned in its opposite limits of movement in response to shifting movements of said selector element selectively to its limits of movement along one of said adjacent paths which is of greater length than the other.

13. In a motor vehicle speed ratio changing transmission, a plurality of speed ratio controlling devices, power operating means for operating said devices, selector means for selectively operably connecting said power operating means with said devices, a manually shiftable selector element, means for mounting said selector element for shifting movements along adjacent paths of corresponding direction but of relatively different length and for displacement toward said mounting means for shifting movements of said selector element along a path transversely connecting said adjacent paths of different length, a follower member, means operably connecting said follower member with said selector means, and means operably connecting said follower member with said selector element for to and fro movement thereof in response to shifting said selector element along said adjacent paths but to provide relative movement between said selector element and said follower member in response to shifting movements of said selector element when displaced toward said mounting means as aforesaid.

14. In a motor vehicle speed ratio changing transmission, a plurality of speed ratio controlling devices, power operating means for operating said devices, selector means for selectively operably connecting said power operating means with said devices, a manually shiftable selector element, means for mounting said selector element for shifting movements along adjacent paths of corresponding direction but of relatively different length and for displacement toward said mounting means for shifting movements of said selector element along a path transversely connecting said adjacent paths of different length, a follower member, means operably connecting said follower member with said selector means, means operably connecting said follower member with said selector element for to and fro movement thereof in response to shifting said selector element along said adjacent paths but to provide relative movement between said selector element and said follower member in response to shifting movements of said selector element when displaced toward said mounting means as aforesaid, an electrical switch, electrically operating means for controlling said power operating means in response to actuation of said switch, and means for actuating said switch in response to shifting movements of said selector element along said adjacent paths.

15. In a motor vehicle speed ratio changing transmission, a plurality of speed ratio controlling devices, power operating means for operating said devices, selector means for selectively operably connecting said power operating means with said devices, a manually shiftable selector element, means for mounting said selector element for shifting movements along adjacent paths of corresponding direction but of relatively different length and for displacement toward said mounting means for shifting movements of said selector element along a path transversely connecting said adjacent paths of different length, a follower member, means operably connecting said follower member with said selector means, means operably connecting said follower member with said selector element for to and fro movement thereof in response to shifting said selector element along said adjacent paths but to provide relative movement between said selector element and said follower member in response to shifting movements of said selector element when displaced toward said mounting means as aforesaid, an electrical switch, electrically operating means for controlling said power operating means in response to actuation of said switch, a switch operating member, means for mounting said switch operating member for actuation thereof by said selector element when the latter is shifted to the ends of said adjacent paths, and means acting in response to displacement of said shift lever along said transverse path and then along the relatively longer of said adjacent paths for preventing operation of said switch by said switch operating member prior to shifting said selector element to the end of said longer path.

16. In a motor vehicle transmission, a plurality of speed ratio controlling devices, power operating means, selector means selectively operatively connecting said power operating means with said devices, a shiftable lever structure having a manually actuable outer end portion shiftable to a plurality of stations of transmission control, means for mounting said lever structure for accommodating to and fro shifting movements thereof in response to manual shifting of said end portion along transversely connecting adjacent paths of corresponding direction but of differing predetermined lengths, means operably connecting said lever structure with said selector means, said connecting means including an operating element movable to and fro in response to shifting movements of said end portion to and fro along said adjacent paths, an electrical switch, electrically energized means for controlling the operation of said power operating means in response to actuation of said switch, a movable switch actuating element engaging said lever structure during said to and fro shifting movements of said end portion, means for moving said switch actuating element to actuate said switch when said lever structure is shifted in proximity to the limits of travel of said end portion along each of said adjacent paths, and means acting in response to shifting said end portion from the shorter to and throughout the length of the longer of said adjacent paths for preventing actuation of said switch by said switch actuating element when said lever structure is thereby shifted through its intermediate positions respectively corresponding to shifting positions of said end portion at the ends of the shorter of said adjacent paths.

17. In a motor vehicle transmission, a plurality of speed ratio controlling devices, power operating means, selector means selectively operatively connecting said power operating means with said devices, a shiftable lever structure having a manually actuable end portion, means for mounting said lever structure for oscillation about an axis of support, a plate disposed transversely to said axis and having a substantially H-shaped slot formed therein to provide a pair of main slot portions and transverse connecting slot portion, said lever structure having a finger guided in said slot during shifting movements thereof, means accommodating displacement of said end portion toward said axis for moving said finger in said connecting slot portion, means operably connecting said lever structure with said selector means, electrically energized means for controlling the operation of said power operating means, switch means controlling said electrically energized means, pivot means for accommodating swinging movement of said lever structure relative to said mounting means, means for operating said switch means in response to swinging movement of said lever structure about said pivot means, and means for swinging said lever structure about said pivot means in response to shifting said lever structure to move said finger in said main slot portions.

18. In a motor vehicle transmission, a plurality of speed ratio controlling devices, power operating means, selector means selectively operatively connecting said power operating means with said devices, a manually shiftable lever structure, means for mounting said lever structure for shifting movements in a substantially H-shaped path to a plurality of stations of transmission driving control and neutral, means operably connecting said lever structure with said selector means, a switch adapted to be opened and closed, electrically energized means under control of said switch for controlling the operation of said power operating means, and switch operating means acting in response to manual selective shifting movements of said lever structure from said neutral station to each of said stations of driving control for closing and maintaining said switch closed during said selective shifting movements, said switch operating means acting to open and maintain said switch opened when said lever structure is disposed at each of said stations.

19. In a power transmission, a plurality of speed ratio controlling devices selectively operable to provide a plurality of forward drives and reverse through the transmission, means for selectively operating said devices including an electrically controlled power operator, a selector element adapted for shifting movements in transversely connecting paths of corresponding directions to a plurality of stations of transmission control for effecting selective operation of said forward and reverse drives, said selector element having a position of shift for effecting a neutral condition in the transmission, a switch adapted to be opened and closed, electrically energized means under control of said switch for controlling the operation of said power operator, and switch operating means acting in response to shifting movements of said selector element from said neutral position to each of said stations for closing and maintaining said switch closed during said shifting movements, said switch operating means acting to open and maintain said switch opened when said selector element is disposed at each of said stations.

20. In a power transmission, a plurality of speed ratio controlling devices selectively operable to provide a plurality of forward drives and reverse through the transmission, means for selectively operating said devices including an electrically controlled power operator, a selector element adapted for shifting movements in transversely connecting paths of corresponding directions to a plurality of stations of transmission control for effecting selective operation of said forward and reverse drives, and power operator control means including an electrical switch adapted for operation in response to shift of said selector element between each of said stations, and means for mounting said selector element for swinging movement about a common axis in said paths of corresponding directions and for movement in a direction generally transversely to said axis in a path transversely connecting said paths of corresponding direction.

21. In a power transmission, a plurality of speed ratio controlling devices selectively operable to provide a plurality of forward drives and reverse through the transmission, electrically controlled operating means for effecting selective operation of said devices, a selector element adapted for shifting movements in transversely connecting paths of corresponding directions to a plurality of stations of transmission control for effecting selective operation of said devices by said operating means, and electrical control means for said operating means comprising a single electrical switch adapted for operation in response to shift of said selector element between each of said stations, and means for mounting said selector element for swinging movement about a common axis in said paths of corresponding directions and for movement in a direction generally transversely to said axis in a path transversely connecting said paths of corresponding direction.

22. In a power transmission, a plurality of speed ratio controlling devices operable to effect selective drives through the transmission, a driver operated selector element adapted for shifting movements in transversely connecting paths of corresponding directions to a plurality of stations of transmission control for effecting operation of said speed ratio controlling devices, means for mounting said selector element for swinging movements about a common axis along said paths of corresponding directions and for movement in a path transversely connecting said paths of corresponding direction, said transversely connecting path being traversed by movement of said selector element substantially at right angles to said common axis, and means operating in response to shift of said selector element for effecting operation of said speed ratio controlling devices.

23. In a power transmission, a plurality of speed ratio controlling devices operable to effect selective drives through the transmission, a driver operated selector element adapted for shifting movements in transversely connecting paths of corresponding directions to a plurality of stations of transmission control for effecting operation of said speed ratio controlling devices, means for mounting said selector element for swinging movements about a common axis along said paths of corresponding directions, said mounting means including a fulcrum support accommodating rocking movement of an end portion of said selector element in the general direction of said axis, means acting to yieldingly urge said selector element from one of said paths of corresponding direction toward the other, and means operating in response to shift of said selector element for effecting operation of said speed ratio controlling devices.

24. In a power transmission, a plurality of speed ratio controlling devices operable to effect selective drives through the transmission, a driver operated selector element adapted for shifting movements in transversely connecting paths of corresponding directions to a plurality of stations of transmission control for effecting operation of said speed ratio controlling devices and for effecting a neutral condition, means operating in response to shift of said selector element for effecting operation of said speed ratio controlling devices, said operating means including an electrically controlled power operator, a switch adapted to be opened and closed for controlling operation of said power operator, and switch operating means acting in response to driver operated shifting movements of said selector element from said neutral station to each of said stations of driving control for closing and maintaining said switch closed during said shifting movements, said switch operating means acting to open and maintain said switch opened when said selector element is disposed at each of said stations.

25. In a power transmission, a plurality of speed ratio controlling devices operable to effect selective drives through the transmission, a driver operated selector element adapted for shifting movements in transversely connecting paths of corresponding directions to a plurality of stations of transmission control for effecting operation of said speed ratio controlling devices and for effecting a neutral condition, means operating in response to shift of said selector element for effecting operation of said speed ratio controlling devices, said operating means including a pressure fluid operated motor, a valve controlling delivery of pressure fluid to said motor, and a solenoid for operating said valve, a switch adapted to be opened and closed for controlling energization of said solenoid, and switch operating means acting in response to driver operated shifting movements of said selector element from said neutral station to each of said stations of driving control for closing and maintaining said switch closed during said shifting movements, said switch operating means acting to open and maintain said switch opened when said selector element is disposed at each of said stations.

26. In a power transmission according to claim 22 wherein a spring is provided to yieldingly urge said selector element from one of said paths of corresponding direction toward the other.

CARL A. NERACHER.
TENO IAVELLI.
AUGUSTIN J. SYROVY.